United States Patent
Kobayashi et al.

(10) Patent No.: US 8,655,022 B2
(45) Date of Patent: *Feb. 18, 2014

(54) SYSTEM AND METHOD FOR DETECTING POSITION OF UNDERWATER VEHICLE

(75) Inventors: Ryosuke Kobayashi, Hitachi (JP); Satoshi Okada, Hitachi (JP); Masahiro Tooma, Hitachiohta (JP); Yutaka Kometani, Hitachinaka (JP); Yosuke Takatori, Hitachi (JP); Mitsuru Odakura, Hitachi (JP); Kojirou Kodaira, Hitachinaka (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 978 days.

This patent is subject to a terminal disclaimer.

(21) Appl. No.: 12/707,091

(22) Filed: Feb. 17, 2010

(65) Prior Publication Data
US 2010/0226541 A1  Sep. 9, 2010

(30) Foreign Application Priority Data
Mar. 3, 2009  (JP) ................. 2009-049051

(51) Int. Cl.
*G06K 9/00* (2006.01)
*G06K 9/32* (2006.01)

(52) U.S. Cl.
USPC ........................ 382/104; 382/291; 382/295

(58) Field of Classification Search
USPC ......... 382/100, 104, 106, 154, 276, 286, 291, 382/293, 295; 356/4.01; 702/5, 155, 158, 702/188
See application file for complete search history.

(56) References Cited

U.S. PATENT DOCUMENTS

| | | | | |
|---|---|---|---|---|
| 5,170,352 A * | 12/1992 | McTamaney et al. | .......... | 701/26 |
| 6,356,600 B1 * | 3/2002 | Kirsteins et al. | .......... | 375/340 |
| 6,542,076 B1 * | 4/2003 | Joao | .......... | 340/539.14 |
| 6,542,077 B2 * | 4/2003 | Joao | .......... | 340/426.16 |
| 6,970,578 B1 * | 11/2005 | Strand | .......... | 382/103 |
| 7,496,226 B2 * | 2/2009 | Negahdaripour et al. | .... | 382/154 |
| 8,115,822 B2 * | 2/2012 | Mimura et al. | .......... | 348/222.1 |
| 8,346,415 B1 * | 1/2013 | Hinnant, Jr. | .......... | 701/21 |
| 8,370,105 B2 * | 2/2013 | Kobayashi et al. | .......... | 702/152 |
| 8,373,862 B2 * | 2/2013 | Mullen et al. | .......... | 356/445 |
| 8,531,515 B2 * | 9/2013 | Watanabe et al. | .......... | 348/81 |

(Continued)

FOREIGN PATENT DOCUMENTS

JP  05-040029 A   2/1993
JP  07-281753 A   10/1995

(Continued)

*Primary Examiner* — Chan Park
*Assistant Examiner* — Mia M Thomas
(74) *Attorney, Agent, or Firm* — Mattingly & Malur, PC

(57) ABSTRACT

The position detection system includes a pressure sensor that detects the vertical position of an underwater vehicle, a range sensor unit that detects the relative distances of the underwater vehicle from its surrounding structures; a measurement image acquisition unit that acquires a measurement image of the horizontal plane, an image storage unit that stores images, an image selector that selects one of the stored images that corresponds to the horizontal plane in which the relative distances have been detected, a corresponding-area identification unit that identifies the area in the selected image that corresponds to the measurement image by performing map matching, and a horizontal position calculator that identifies, the pixel that corresponds to the position at which the relative distances have been detected and calculates the horizontal position of the underwater vehicle.

11 Claims, 12 Drawing Sheets

(56) References Cited

U.S. PATENT DOCUMENTS

2008/0251024 A1* 10/2008 Bos et al. .................. 119/14.18
2009/0110289 A1* 4/2009 Maggiore et al. ............. 382/195
2009/0312980 A1* 12/2009 Kobayashi et al. ........... 702/150
2010/0226541 A1* 9/2010 Kobayashi et al. ........... 382/106
2011/0208011 A1* 8/2011 Ben-Horin .................. 600/300

FOREIGN PATENT DOCUMENTS

| | | |
|---|---|---|
| JP | 09-211178 A | 8/1997 |
| JP | 2003-014477 A | 1/2003 |
| JP | 2005-315709 A | 11/2005 |
| JP | 2006-349449 A | 12/2006 |
| JP | 2008-159031 A | 7/2008 |

* cited by examiner

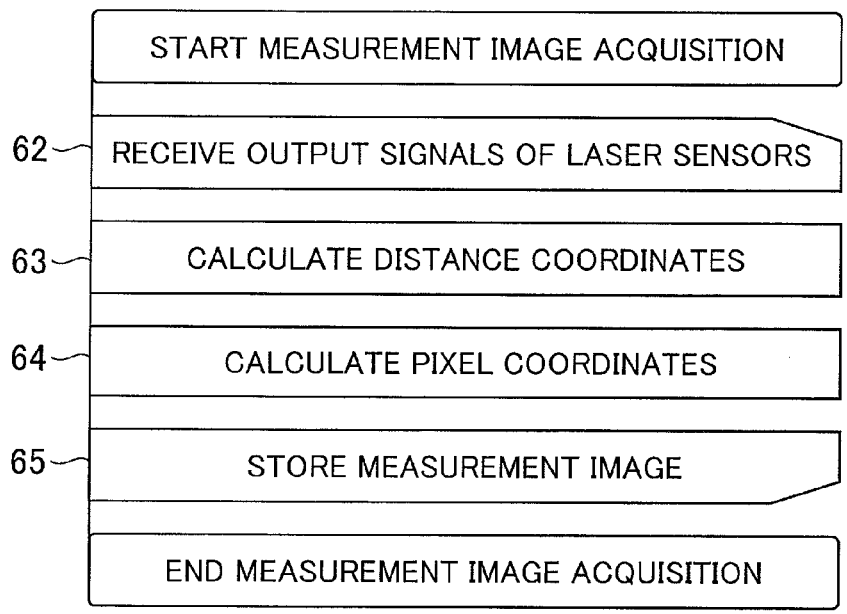
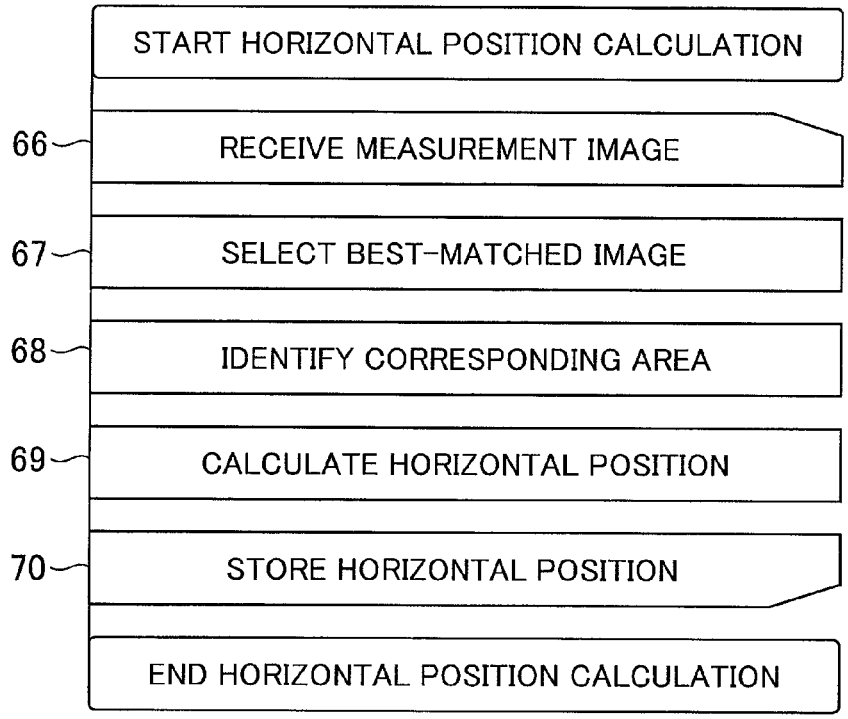

SYSTEM AND METHOD FOR DETECTING POSITION OF UNDERWATER VEHICLE

BACKGROUND OF THE INVENTION

1. Field of the Invention

The present invention relates to a system and method for detecting the position of an underwater vehicle or object that moves three-dimensionally.

2. Description of the Related Art

One known technology that involves the use of a system for detecting the position of a three-dimensionally-driven underwater vehicle is a nuclear reactor inspection system that is designed to inspect the internal structures of a nuclear reactor with the use of an underwater inspection apparatus that moves three-dimensionally.

An example of such a nuclear reactor inspection system is the one disclosed in JP-2005-315709-A. In the nuclear reactor inspection system of JP-2005-315709-A, an underwater inspection apparatus is provided with various detectors for detecting state quantities indicative of the position and attitude of the underwater inspection apparatus. The detectors include an acceleration sensor that detects accelerations in the directions of x-, y-, and z-axes, a gyroscope that detects angular velocities around the three axes, and a camera that images an object irradiated with laser light. The detection results obtained by those detectors are transmitted to a control device for computation of the absolute position of the underwater inspection apparatus.

SUMMARY OF THE INVENTION

In the nuclear reactor inspection system of JP-2005-315709-A, the control device calculates the absolute position of the underwater inspection apparatus by calculating displacement values of the underwater inspection apparatus and integrating the calculated displacement values. Thus, the inspection system is susceptible to an increase in the error of the absolute position if errors involved in the displacement calculation accumulate. Although the inspection system is designed to correct the error of the absolute position by examining whether the underwater inspection apparatus comes into contact with the internal structures of the nuclear reactor, the error is still likely to increase until the correction is made after the underwater inspection apparatus has come into contact with the structures. Therefore, there is room for improvement in the accuracy of detecting the position of the underwater inspection apparatus.

An object of the invention is thus to provide a system and method for detecting the position of an underwater vehicle that enable an improvement in the accuracy of detecting the position of the underwater vehicle.

The present invention that achieves the above object is a position detection system for an underwater vehicle, the system comprising: an underwater vehicle being movable in a three-dimensional space; vertical position detecting means for detecting the vertical position of the underwater vehicle; relative distance detecting means for detecting the relative distances of the underwater vehicle from its surrounding structures in a horizontal plane determined by the vertical position of the underwater vehicle; measurement image acquiring means for acquiring, based on the relative distances detected by the relative distance detecting means, a measurement image that is the image data representing the outer shapes of the structures in the horizontal plane in which the relative distances have been detected; image storing means for storing images, each of the stored images having at least one pixel to which horizontal position information of the three-dimensional space is attached, each of the stored images being the image data of the outer shapes of the structures in a given horizontal plane of the three-dimensional space; image selecting means for selecting, based on the vertical position detected by the vertical position detecting means, one of the stored images that corresponds to the horizontal plane in which the relative distances have been detected from among the images stored on the image storing means; corresponding-area identifying means for identifying the area in the selected image that corresponds to the measurement image by performing correlation-based map matching on the selected image and the measurement image; and horizontal position calculating means for identifying, from the corresponding area in the selected image identified by the corresponding-area identifying means, the pixel that corresponds to the position at which the relative distances have been detected and for calculating the horizontal position of the underwater vehicle based on the position of the identified pixel and the position of the pixel in the selected image to which the horizontal position information is attached.

In accordance with the invention, it is possible to enhance the accuracy of detecting the position of an underwater vehicle.

BRIEF DESCRIPTION OF THE DRAWINGS

FIG. 11 is a PAD illustrating the details of the measurement image acquisition of FIG. 7;

FIG. 12 is a PAD illustrating the details of the horizontal position calculation of FIG. 7;

DESCRIPTION OF THE PREFERRED EMBODIMENTS

Embodiments of the invention will now be described with reference to the accompanying drawings.

Figure 1:
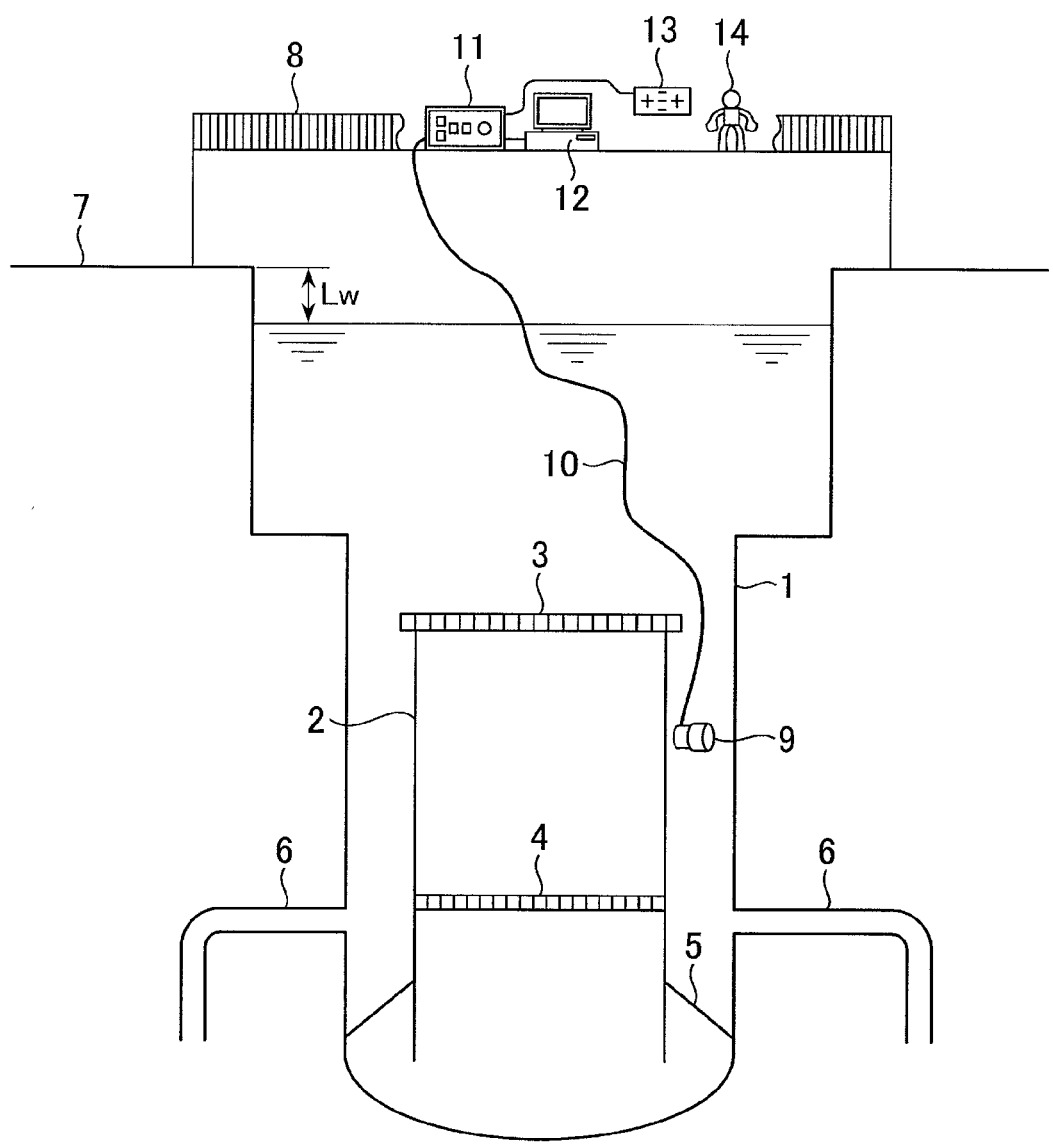
FIG. 1 is a schematic illustrating a nuclear reactor inspection system according to an embodiment of the invention.

FIG. 1 is a schematic illustrating a nuclear reactor inspection system according to an embodiment of the invention.

The nuclear reactor 1 shown in FIG. 1 comprises structures such as a shroud 2, a top guide 3, a core support plate 4, a shroud support 5, and the like and piping such as primary loop recirculation (PLR) piping 6 and the like. On top of the nuclear reactor 1 is an operation floor 7, or work space, on which a fuel-handling machine 8 is provided.

A nuclear reactor inspection system according to the present embodiment includes an underwater inspection apparatus 9 (underwater unmanned vehicle; hereinafter referred to simply as the underwater vehicle) that is employed for visual inspection of the internal structures of the nuclear reactor 1; and a control device 11 that is connected to the underwater vehicle 9 via an umbilical 10. The nuclear reactor inspection system further includes a display device 12 that is connected to the control device 11 and displays camera images acquired by the underwater vehicle 9 as well as the position and attitude of the underwater vehicle 9; and a remote controller 13 that is connected to the control device 11 and adapted to remotely control the underwater vehicle 9. Upon visual inspection of the internal structures of the nuclear reactor 1, an operator 14 positioned on the fuel-handling machine 8 launches the underwater vehicle 9 into the nuclear reactor 1 and controls the underwater vehicle 9 with the remote controller 13 while monitoring the position and attitude of the underwater vehicle 9 with the display device 12.

Figure 2:
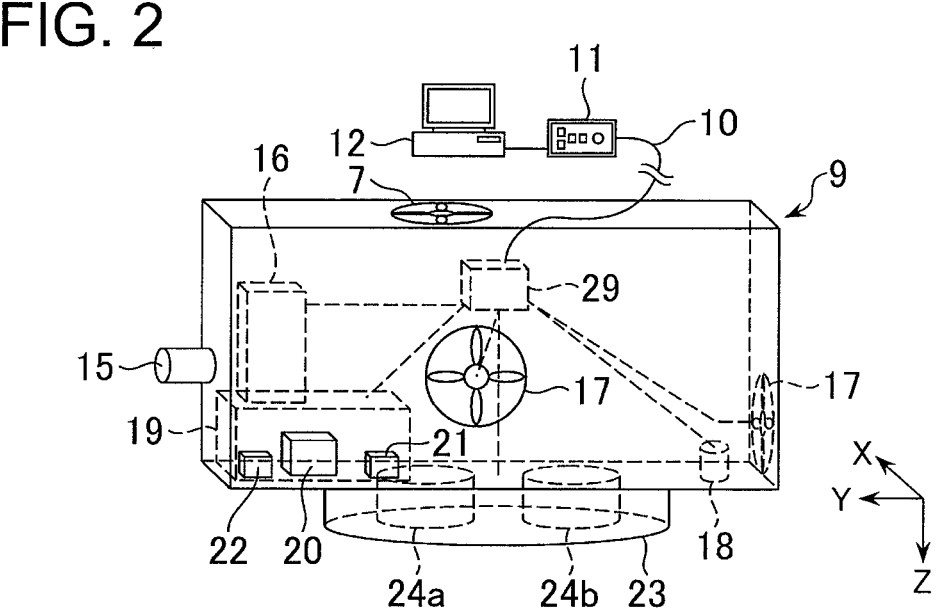
FIG. 2 is a schematic illustrating an underwater inspection apparatus according to an embodiment of the invention.

FIG. 2 is a schematic illustrating the underwater vehicle 9 according to an embodiment of the invention.

As shown in FIG. 2, the underwater vehicle 9 includes a camera 15 that is located on its front face (on the left of FIG. 2) and adapted to image the internal structures of the nuclear reactor 1; and an image capture device 16 that converts the images acquired by the camera 15 into electronic information. The underwater vehicle 9 is also provided with three thrusters (propellant mechanisms) 17, with one being located on the top of the vehicle body (the upper side of FIG. 2), another on the back (the right of FIG. 2), and the other on the left (the front side of FIG. 2). Those three thrusters 17 each include a propeller screw and a motor (not shown) that rotates the propeller screw bi-directionally. The three thrusters 17 impart to the underwater vehicle 9 the ability to move vertically (in the upward and downward directions of FIG. 2), back and forth (in the right and left directions of FIG. 2), and horizontally (in the front and back directions of FIG. 2). In other words, the thrusters 17 enable the underwater vehicle 9 to move freely in a three-dimensional space filled with water. Note that the coordinate system of the underwater vehicle 9 as adopted herein is a right-handed coordinate system wherein the vertically downward direction of the vehicle body (the downward direction of FIG. 2) is the direction of the positive z-axis. More specifically, the right direction of the underwater vehicle 9 (the back direction of FIG. 2) is the direction of the positive x-axis, its forward direction (the left direction of FIG. 2) is the direction of the positive y-axis, and its downward direction (the downward direction of FIG. 2) is the direction of the positive z-axis, where the x-axis and the y-axis are both perpendicular to the z-axis and perpendicular to each other.

The underwater vehicle 9 also includes a pressure sensor (vertical position detector) 18 that detects the water pressure acting on the vehicle 9; an inertial sensor (attitude angle detector) 19 that detects the attitude (attitude angle) of the vehicle 9 inside the nuclear reactor 1; and a range sensor unit (relative distance detector) 23 attached to the bottom of the vehicle 9.

The pressure detected by the pressure sensor 18 is used for detection of the vertical position of the underwater vehicle 9 inside the nuclear reactor 1, i.e., the water depth at which the vehicle 9 lies. The inertial sensor 19 includes a tri-axis gyroscope (angular velocity detector) 20 that detects angular velocities around the x-, y-, and x-axes; a tiltmeter 21 that detects tilt angles around the x- and y-axes; and a magnetic sensor (azimuth detector) 22 that detects angles (azimuths) around the z-axis. The values detected by those components of the inertial sensor 19 are used for detection of the attitude angle of the underwater vehicle 9.

Figure 3:
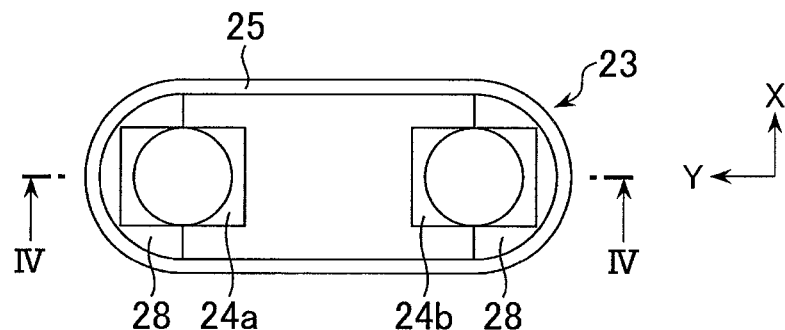
FIG. 3 is a horizontal cross-section of a range sensor unit according to an embodiment of the invention.
Figure 4:
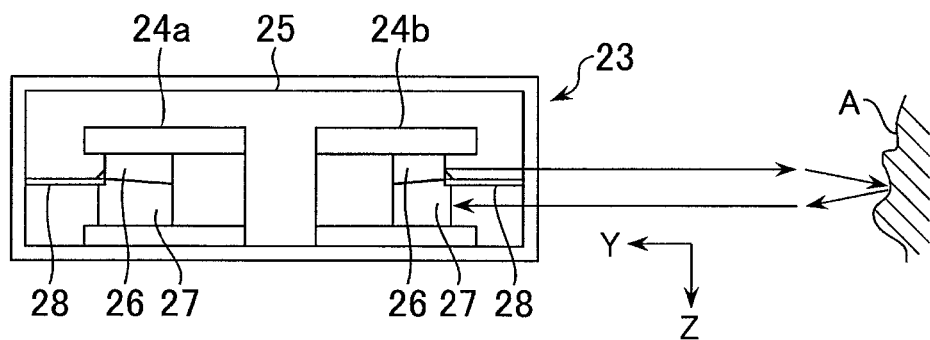
FIG. 4 is a vertical cross-section of the range sensor unit taken along line IV-IV of FIG. 3.

FIG. 3 is a horizontal cross-section of the range sensor unit 23, and FIG. 4 is a vertical cross-section taken along line IV-IV of FIG. 3.

The range sensor unit 23 detects the relative distances of the underwater vehicle 9 from the internal structures of the nuclear reactor 1 in a horizontal plane that is determined by the vertical position of the underwater vehicle 9. Inside the casing 25 of the range sensor unit 23 are, as shown in FIG. 3, two scanning laser sensors (laser range finders) 24$a$ and 24$b$, with the laser sensor 24$a$ being located on the front side of the underwater vehicle 9 and the laser sensor 24$b$ on the back side. Note that the word "horizontal plane" as used in this application refers not only to a completely horizontal plane but to a substantially horizontal plane with some errors.

As shown in FIG. 4, the laser sensors 24$a$ and 24$b$ each include a light emitting unit 26 that emits laser light and a light receiving unit 27 that receives its reflected light. The light emitting units 26 are each rotated around the z-axis by a scanning unit (not shown) and scan laser light across a plane. The laser light emitted from and scanned by the light emitting units 26 are reflected by the surrounding internal structures of the nuclear reactor 1 and eventually received by the light receiving units 27. In the present embodiment, the relative distances of the underwater vehicle 9 from the internal structures of the nuclear reactor 1 are measured based on the flight time of the laser light that spans from the light emission time to the reflected-light receipt time. The thus-measured relative distances are used primarily for acquisition of a measurement image by a measurement image acquisition unit 36 which will later be described.

The laser sensors 24$a$ and 24$b$ of the present embodiment are each provided with a substantially U-shaped light blocking plate 28 to separate the light emitting units 26 from the light receiving units 27. The purpose of the light blocking plates 28 is to prevent the light receiving units 27 from receiving the reflected light that results from the internal surfaces of the casing 25 reflecting part of the light emitted from the light emitting units 26.

As shown in FIG. 3, it is preferred that the anterior lateral face of the casing 25 be arch-shaped in horizontal cross-section so as to surround the laser sensor unit 24$a$. Likewise, it is preferred that the posterior lateral face of the casing 25 be arch-shaped in horizontal cross-section so as to surround the laser sensor unit 24$b$. Such shaping of the casing 25 allows the light emitting units 26 to emit laser light perpendicularly to the lateral faces of the casing 25 and the light receiving units 27 to receive its reflected light perpendicularly thereto, which in turn prevents the intensity of the laser light from decreasing during the travel of the laser light into/out of the casing 25. The structure of the laser sensors 24$a$ and 24$b$ is described more in detail in Japanese Unexamined Patent Application Publication No. 2006-349449.

Figure 5:
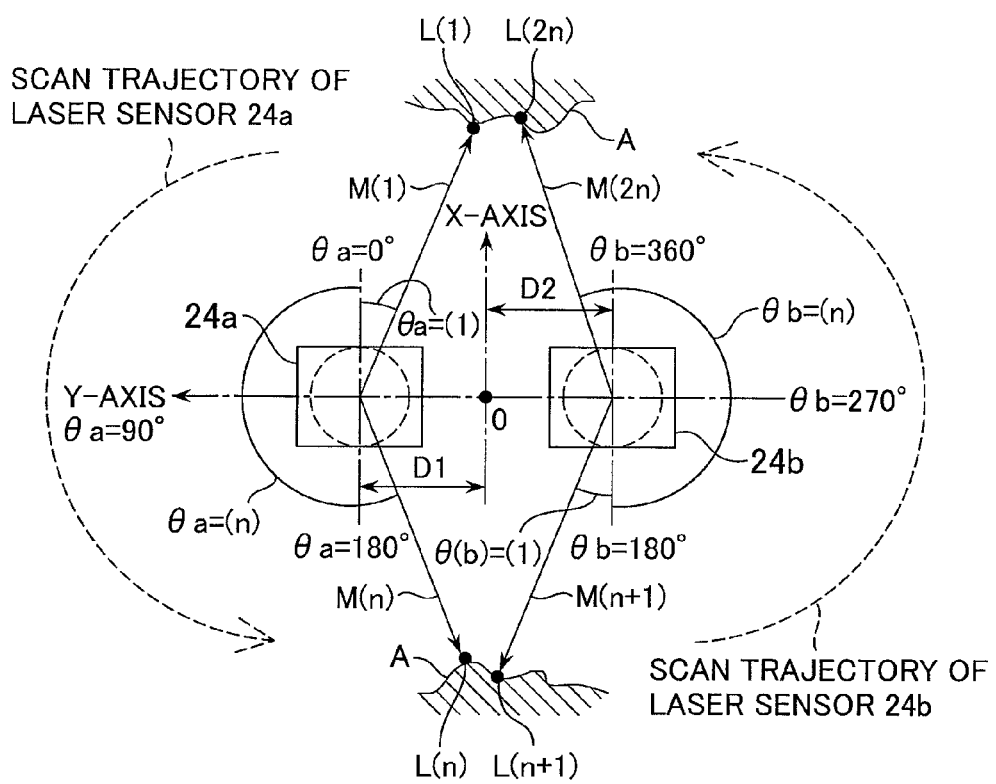
FIG. 5 is a diagram illustrating the operation of the range sensor unit during measurement according to an embodiment of the invention.

FIG. 5 is a diagram illustrating the operation of the range sensor unit 23 during measurement.

As shown in FIG. 5, the laser sensor 24$a$ scans and receives laser light within the scan angular range from θa (1) to θa (n) (e.g., from −30° to 210°), which is the anterior scan range of the underwater vehicle 9, and detects the relative distances M (1) to M (n) of the vehicle 9 from structures A. The laser sensor 24b, on the other hand, scans and receives laser light within the scan angular range from θb (1) to θb (n) (e.g., from 150° to 390°), which is the posterior scan range of the underwater vehicle 9, and detects the relative distances M (n+1) to M (2n) of the vehicle 9 from the structures A. This enables detection of the relative distances of the underwater vehicle 9 from its surrounding structures in a horizontal plane in which the laser sensors 24a and 24b lie.

With reference back to FIG. 2, the underwater vehicle 9 is also provided with a signal transmission unit 29. The control device 11 receives, via the signal transmission unit 29 and the umbilical 10, signals detected by the pressure sensor 18, the inertial sensor 19 (comprising the tri-axis gyroscope 20, the tiltmeter 21, and the magnetic sensor 22), and the range sensor unit 23 (comprising the laser sensors 24a and 24b) and image signals from the image capture device 16. Based on the detected signals, the control device 11 calculates the position and attitude of the underwater vehicle 9 and outputs them to the display device 12 for display. The control device 11 also outputs the image signals to the display device 12 so that the display device 12 can display the images acquired by the camera 15 (an exemplary display screen will later be descried with reference to FIG. 13). Further, the control device 11 generates control signals to drive the thrusters 17 in response to command signals from the remote controller 13 and outputs those signals to the thrusters 17 via the umbilical 10 and the signal transmission unit 29.

Figure 6:
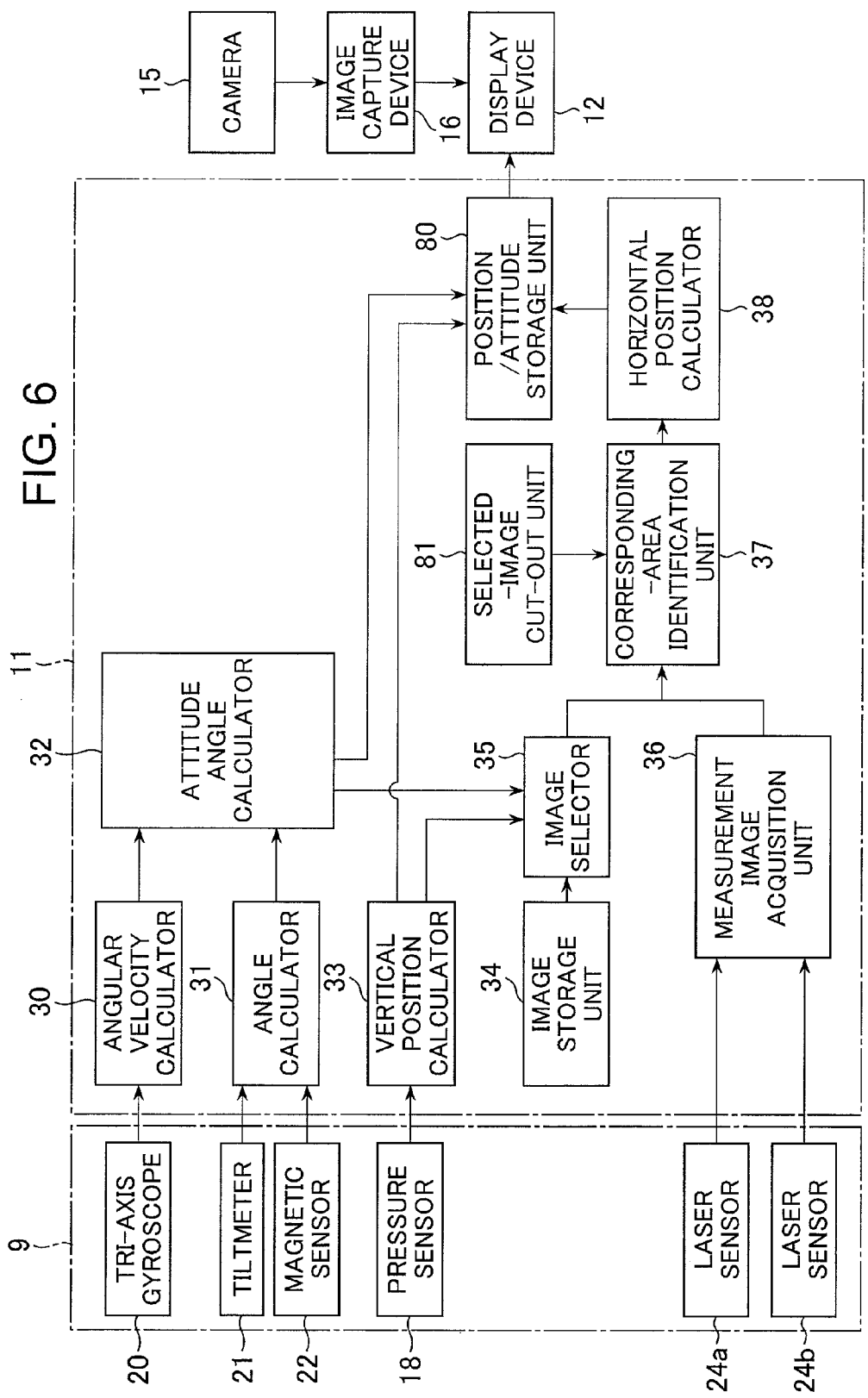
FIG. 6 is a functional block diagram of a control device according to an embodiment of the invention.

Described next is the functions performed by the control device 11 during position/attitude calculation. FIG. 6 is a functional block diagram of the control device 11.

As shown in FIG. 6, the control device 11 includes an angular velocity calculator 30, an angle calculator 31, and an attitude angle calculator 32. The angular velocity calculator 30 calculates angular velocities around the x-, y-, and z-axes based on angular velocity signals from the tri-axis gyroscope 20. The angle calculator 31 calculates tilt angles around the x- and y-axes based on angle signals from the tiltmeter 21 and also calculates an azimuth around the z-axis based on an angle signal from the magnetic sensor 22. The attitude angle calculator 32 calculates the attitude angles of the underwater vehicle 9 around the x-, y-, and z-axes based on the above angular velocities, tilt angles, and azimuth. The control device 11 also includes a vertical position calculator 33 that calculates the vertical position of the underwater vehicle 9 (or the water depth where the vehicle 9 lies) based on a pressure signal from the pressure sensor 18.

The control device 11 further includes the measurement image acquisition unit 36 (mentioned above), an image storage unit 34, an image selector 35, a corresponding-area identification unit 37, a horizontal position calculator 38, and a position/attitude storage unit 80.

The measurement image acquisition unit 36 performs bitmap conversion to acquire the image data (or an measurement image) of the outer shapes of structures in a horizontal plane. More specifically, based on the relative distances of the underwater vehicle 9 from its surrounding structures, which are detected by the range sensor unit 23, the measurement image acquisition unit 36 acquires the image data of the outer shapes of the structures in the horizontal plane where the relative distances were measured (hereinafter, this horizontal plane is also referred to as the scan plane). In the present embodiment, the bitmap conversion performed by the measurement image acquisition 36, that is, conversion of detected relative distances into a measurement image, involves the use of a coefficient K to convert distance [mm] into pixel values [pixel]. The measurement image acquired by the bitmap conversion is a horizontal cross-section that is taken along the scan plane and represents part of the outer shapes of the internal structures of the nuclear reactor 1. The value of the coefficient K adopted in the present embodiment is one that leads to bitmap images of a size of 640×480 pixels.

The image storage unit 34 stores the image data (or images) of the outer shapes of the internal structures of the nuclear reactor 1 which is taken from any desired horizontal plane of the nuclear reactor 1. In other words, the stored images are each a horizontal cross-section representing the outer shapes of the internal structures of the nuclear reactor 1. Each of the stored images has information on a vertical position inside the nuclear reactor 1.

Further, at least one of the pixels that constitute each of the images stored on the image storage unit 34 has information on a horizontal position inside the nuclear reactor 1 (hereinafter, that pixel containing the horizontal position information is also referred to as the reference pixel). It is preferred that the stored images be large in size for the purpose of enhancing the accuracy of calculating horizontal positions. The reason is that increasing the size of the images leads to a higher accuracy of the horizontal position information attached to each of the reference pixels.

The image selector 35 selects from among the images stored on the image storage unit 34 the image corresponding to a horizontal plane where the range sensor unit 23 detects the relative distances of the underwater vehicle 9, based on the vertical position of the vehicle 9 detected by the pressure sensor 18. More specifically, the image selector 35 selects one of the stored images that has information on the same vertical position as that calculated by the vertical position calculator 33. If there is none, the image that has information on the closest vertical position is selected.

Another way to perform the image selection is the following. Select a possible optimal image based on the vertical position of the underwater vehicle 9 during the first selection. Provide a threshold value M2 (a second threshold value) below which image reselection is unnecessary. When the match rate between the selected optimal image and a measurement image calculated by the corresponding-area identification unit 37 for the subsequent horizontal position calculation is found to be less than M2, select another possible optimal image whose match rate is equal to or greater than M2. A possible method to select such a stored image (match rate≥M2) is the following. First, as reselection candidates, select multiple stored images that include a movable range of the underwater vehicle 9 from among the stored images that have vertical position information similar to that possessed by the above optimal image selected during the first selection (match rate<M2). Next, calculate the match rates between the multiple stored images selected and the measurement image and select the stored image with the highest match rate. The above-described selection allows the constant use of stored images whose match rates are higher than a particular value, thereby enhancing the accuracy of calculating the horizontal position of the underwater vehicle 9.

The corresponding-area identification unit 37 performs correlation-based map matching on the image selected by the image selector 35 and the measurement image acquired by the measurement image acquisition unit 36 to identify which area in the selected image corresponds to the measurement image. In other words, the corresponding-area identification unit 37 examines which shape depicted on the bitmap image of the measurement image corresponds to which area in the bitmap image of the selected image.

The horizontal position calculator 38 searches the corresponding area in the selected image identified by the corresponding-area identification unit 37 for the pixel that corresponds to the position at which the relative distances were detected, that is, the position of the range sensor unit 23. Based on the position of that pixel and the position of the reference pixel of the selected image, the horizontal position calculator 38 calculates the horizontal position of the underwater vehicle 9. As is obvious from FIG. 5, "the position at which the relative distances were detected" is located at the center of the measurement image and represents the horizontal position of the underwater vehicle 9. Thus, once the position of the pixel in the selected image that coincides with the center of the measurement image is known, the horizontal position of the underwater vehicle 9 can be calculated by obtaining the distance between that pixel and the reference pixel. If the pixel values need to be converted into distance data, the pixel values can be multiplied by the reciprocal of the above-mentioned coefficient K (i.e., 1/K), which coefficient is used for conversion from distance to pixel values.

The position/attitude storage unit 80 stores the vertical position, the horizontal position, and the attitude angles of the underwater vehicle 9 calculated respectively by the vertical position calculator 33, the horizontal position calculator 38, and the attitude angle calculator 32. Those positions and attitude angles stored on the position/attitude storage unit 80 are transmitted to the display device 12, where they are displayed together with the images of the visual inspection camera 15 that are computerized by the image capture device 16.

Discussed next is the control process performed by the above-described control device 11.

Figure 7:
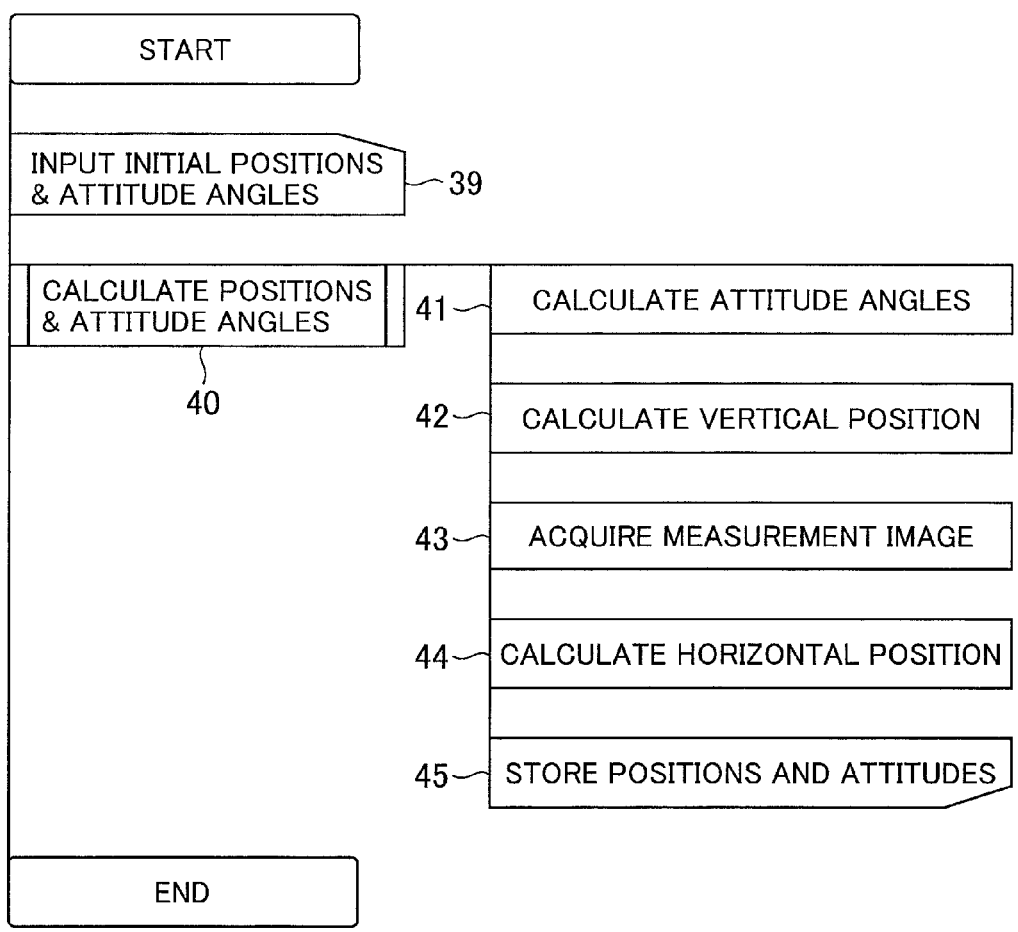
FIG. 7 is a PAD (Problem Analysis Diagram) illustrating the process flow of the control process performed by the control device during position/attitude calculation according to an embodiment of the invention.

FIG. 7 is a PAD (Problem Analysis Diagram; a variant of flowchart) illustrating the process flow of the control process performed by the control device 11 during position/attitude calculation.

As shown in FIG. 7, the process starts with Step 39, where the initial positions and initial attitude angles of the underwater vehicle 9 are input to and stored on the position/attitude storage unit 80. In Step 40, position/attitude calculation is performed right after the underwater vehicle 9 is operated. Performed during the position/attitude calculation are attitude angle calculation (Step 41), vertical position calculation (Step 42), measurement image acquisition (Step 43), and horizontal position calculation (Step 44). These steps are repeated in that order, and the attitude angles, vertical positions, and horizontal positions calculated Steps 41, 42, and 44, respectively, are stored on the position/attitude storage unit 80 in Step 45 right after each calculation. Hereinafter, Steps 41 to 44 are described in detail.

1) Attitude Angle Calculation

Figure 8:
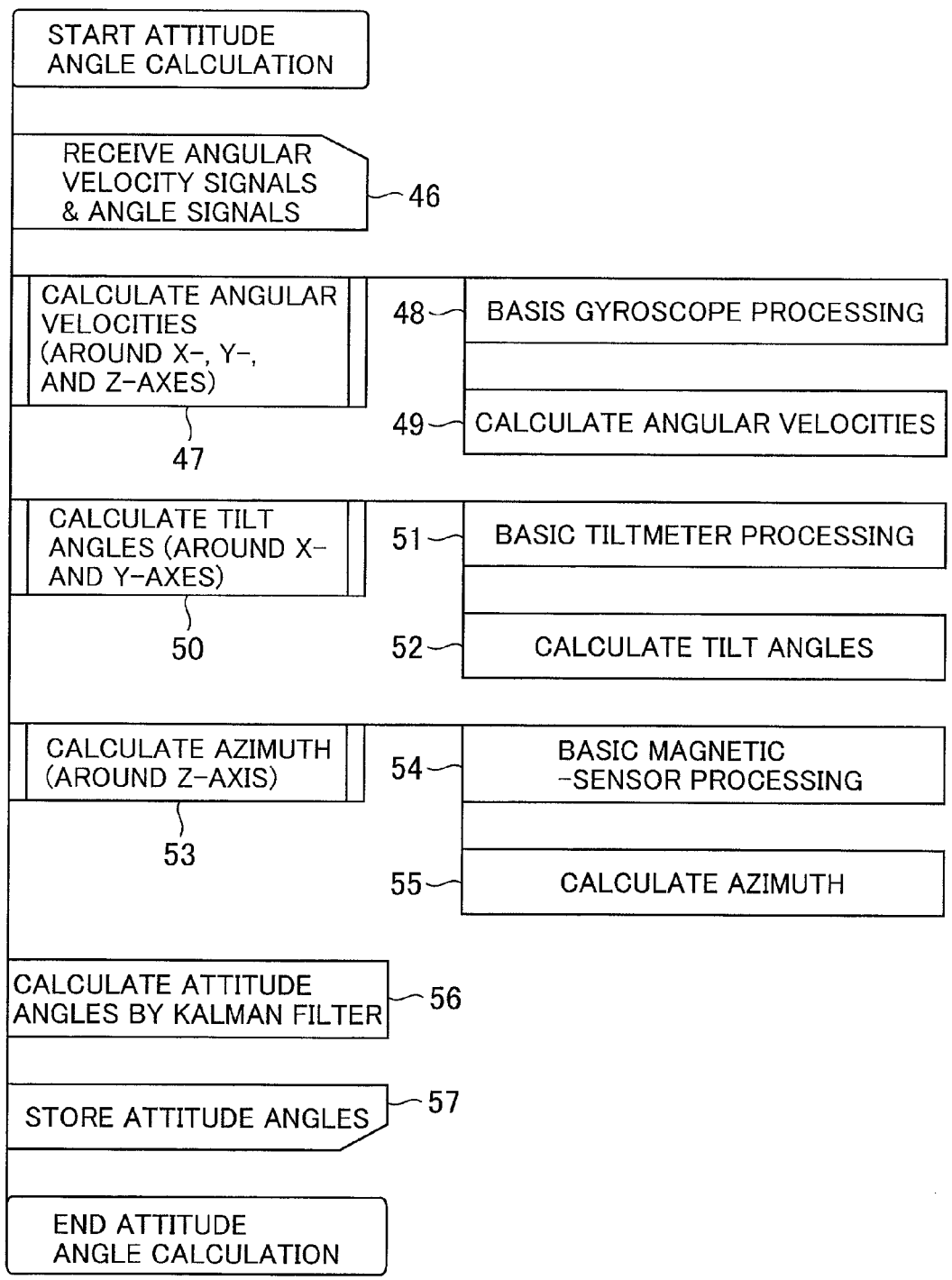
FIG. 8 is a PAD illustrating the details of the attitude angle calculation of FIG. 7.

FIG. 8 is a PAD illustrating the details of the attitude angle calculation of Step 41 shown in FIG. 7.

In Step 46, the angular velocity calculator 30 receives angular velocity signals from the tri-axis gyroscope 20, and the angle calculator 31 receives angle signals from the tiltmeter 21 and the magnetic sensor 22.

In Step 47, the angular velocity calculator 30 calculates angular velocities around the x-, y-, and z-axes based on the angular velocity signals from the tri-axis gyroscope 20. The tri-axis gyroscope 20 of the present embodiment is an electrostatic one that outputs positive voltage values obtained by adding a reference voltage (fixed value) to voltage values that increase in proportion to angular velocity. Accordingly, basic processing is performed in Step 48 to subtract the reference voltage from the signals obtained around the x-, y-, and x-axes of the tri-axis gyroscope 20. While the reference voltage is often specified in the specification of a tri-axis gyroscope, the present embodiment employs a value that is obtained by measuring voltage values without inputting an angular velocity signal to the tri-axis gyroscope 20 and averaging the measured voltage values. In Step 49, angular velocities around the x-, y-, and x-axes are calculated by multiplying the angular velocity signals from which the reference voltage was subtracted by a voltage-to-angular-velocity conversion coefficient (the fixed value specified in the specification of the tri-axis gyroscope 20).

The angular velocity calculation of Steps 47 to 49 is followed by Step 50, where the angle calculator 31 calculates tilt angles around the x- and y-axes based on the angle signals from the tiltmeter 21. The tiltmeter 21 of the present embodiment converts changes in the liquid surface of the electrolytic solution contained in the tiltmeter 21 (tilt angles around the x- and y-axes) into voltage changes and outputs the voltage changes. Accordingly, basic processing is performed in Step 51 to subtract a reference voltage (the fixed value specified in the specification of the tiltmeter 21) from the angle signals obtained around the x- and y-axes. In Step 52, tilt angles around the x- and y-axes are calculated by multiplying the angle signals from which the reference voltage was subtracted by a voltage-to-tilt-angle conversion coefficient (the fixed value specified in the specification of the tiltmeter 21).

The tilt angle calculation of Steps 50 to 52 is followed by Step 53, where the angle calculator 31 calculates an azimuth around the z-axis based on angle signals from the magnetic sensor 22. The magnetic sensor 22 of the present embodiment includes a hall element with the x-axial and y-axial sensitivity to detect and output magnetic force. Accordingly, basic processing is performed in Step 54 to subtract a reference voltage from magnetic signals obtained around the x- and y-axes and multiply the magnetic signals from which the reference voltage was subtracted by the gain of the magnetic sensor 22. Because the reference voltage and the gain vary depending on the environment in which the magnetic sensor 22 is used, those are measured in advance in the actual environment. In Step 55, the azimuth θm around the z-axis is calculated by plugging the x-axis signal Mx and y-axis signal My for which the basing processing was performed into the following Formula (1).

[Formula 1]

$$\theta_m = \tan^{-1}(My/Mx) \qquad (1)$$

The azimuth calculation of Steps 53 to 55 is followed by Step 56, where the attitude angle calculator 32 inputs all the values obtained above, i.e., the angular velocities around the x-, y-, and z-axes, the tilt angles around the x- and y-axes, and the azimuth around the z-axis, into a Kalman filter (well known in the art; see JP-2005-315709-A above). By doing this, the attitude angle calculator 32 estimates the optimal values of the attitude angles around the x-, y-, and z-axes of the underwater vehicle 9. In Step 57, the position/attitude storage unit 80 stores the estimated attitude angles of the underwater vehicle 9, thus completing the attitude angle calculation.

2) Vertical Position Calculation

Figure 9:
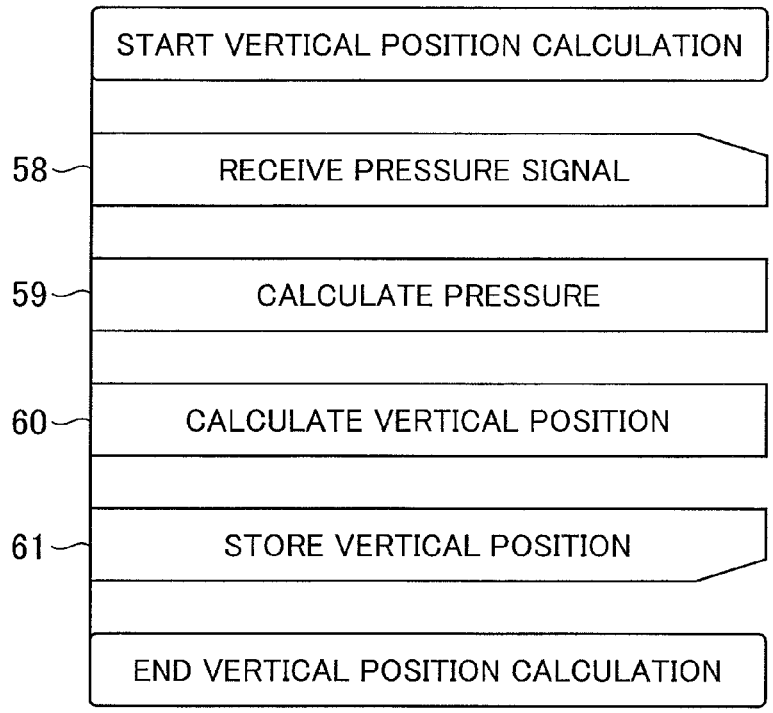
FIG. 9 is a PAD illustrating the details of the vertical position calculation of FIG. 7.

FIG. 9 is a PAD illustrating the details of the vertical position calculation of Step 42 shown in FIG. 7.

Upon the vertical position calculation, the vertical position calculator 33 calculates the water pressure P acting on the underwater vehicle 9 using Formula (2) below. To do this, the vertical position calculator 33 first receives a pressure signal (voltage Vp) from the pressure sensor 18 in Step 58. Then in Step 59, the vertical position calculator 33 subtracts from the voltage Vp a reference voltage Vp_base (the fixed voltage value specified in the specification of the pressure sensor 18) and multiplies the difference by a voltage-to-pressure conversion coefficient Kv_p (the fixed value specified in the specification of the pressure sensor 18).

[Formula 2]

$$P = K_{v\_p} \cdot (V_p - V_{p\_base}) \quad (2)$$

Next in Step 60, the vertical position calculator 33 calculates the depth H at which the underwater vehicle 9 lies by plugging into Formula 3 below the pressure P, the density ρ of the coolant inside the nuclear reactor 1, and the gravitational acceleration g. Then, the distance Lw between the operation floor 7 and the water surface (see FIG. 1) is added to the calculated depth H to obtain the vertical position of the underwater vehicle 9.

[Formula 3]

$$H = \frac{P}{\rho g} \quad (3)$$

In Step 61, the position/attitude storage unit 80 stores the obtained vertical position of the underwater vehicle 9, thus completing the vertical position calculation.

Figure 10:
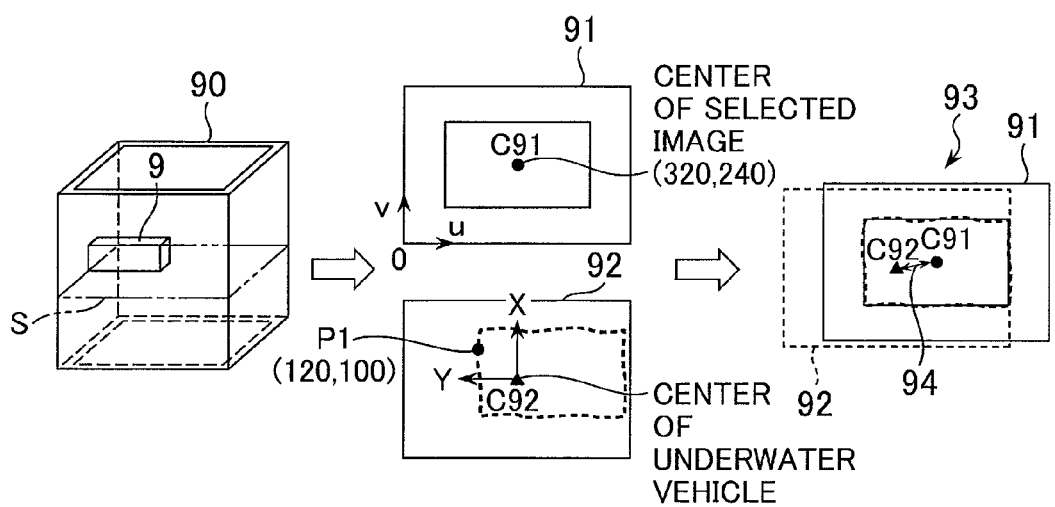
FIG. 10 is a diagram illustrating the measurement image acquisition and the horizontal position calculation performed by the control device.

The explanation of the measurement image acquisition (Step 43) and the horizontal position calculation (Step 44) that follows is based on the assumption that the underwater vehicle 9 inspects the inside of such a hollow cuboid as shown in FIG. 10 for the purpose of facilitating understanding.

FIG. 10 is a diagram illustrating the measurement image acquisition and the horizontal position calculation performed by the control device 11. As shown in the figure, the underwater vehicle 9 is located inside a hollow cuboid 90 filled completely with water. The horizontal position of the underwater vehicle 9 is calculated based on a selected image 91 of a scan plane S and a measurement image 92 obtained from the scan plane S. The selected image 91 and the measurement image 92 are both 640×480 pixels in size. The selected image 91 has a center C91, and the measurement image 92 has a center C92.

3) Measurement Image Acquisition (Computation of the Shapes of Structures)

FIG. 11 is a PAD illustrating the details of the measurement image acquisition of Step 43 shown in FIG. 7.

Upon the measurement image acquisition, the measurement image acquisition unit 36 first receives output signals from the laser sensors 24*a* and 24*b* in Step 62. As stated with reference to FIG. 5, the range sensor unit 23 (comprising the laser sensors 24*a* and 24*b*) of the present embodiment measures the relative distances of the underwater vehicle 9 from the internal structures of the nuclear reactor 1 in a horizontal scan plane (as in the scan plane S of FIG. 10). The output signals from the laser sensors 24*a* and 24*b* thus include information on the laser scan angles θa and θb and on the distances M to the structures measured from each scan angle. In Step 63, the measurement image acquisition unit 36 uses Formula 4 below to calculate the coordinates L (xL and yL) in the scan plane S at which the outer shapes of the structures are located based on the output signals received in Step 62.

[Formula 4]

$$\begin{cases} xL = M(n) \cdot \cos\{\theta(n)\} \\ yL = M(n) \cdot \sin\{\theta(n)\} \end{cases} \quad (4)$$

In Step 64, the measurement image acquisition unit 36 multiplies the coordinates xL and yL calculated in Step 63 by the aforementioned coefficient K to obtain the pixel coordinates L' (KxL and KyL) in the measurement image 92 that indicate the outer shapes of the structures. For example, the pixel coordinates (120, 100) of the point P1 shown in FIG. 10 means that the point P1 is located away from the center C92 of the measurement image 92, which is also the center of the underwater vehicle 9, by 120 pixels in the direction of the positive x-axis and by 100 pixels in the direction of the positive y-axis. The measurement image acquisition unit 36 repeats the calculation processes of Steps 63 and 64 for all the scan angles θa and θb to obtain the measurement image 92. In Step 65, the measurement image acquisition unit 36 stores the data of the thus-obtained measurement image 92, thereby completing the measurement image acquisition.

4) Horizontal Position Calculation

FIG. 12 is a PAD illustrating the details of the horizontal position calculation of Step 44 shown in FIG. 7.

The horizontal position calculation starts with Step 66, where the corresponding-area identification unit 37 receives the measurement image 92 acquired in Step 43. In Step 67, based on the vertical position of the underwater vehicle 9 obtained in Step 42, the image selector 35 selects an image to be compared with the measurement image 92 (i.e., the selected image 91) from among the multiple images stored on the image storage unit 34. In other words, the selected image 91 is an image that has information on the same vertical position as that of the scan plane S of FIG. 10. As already stated in the explanation of the image selector 35, an image whose match rate is equal to or greater than M2 can instead be selected during the second and subsequent horizontal position calculations if the vertical movement of the underwater vehicle 9 results in the match rate between the selected image 91 and the measurement image 92 dropping below M2.

In Step 68, the corresponding-area identification unit 37 performs correlation-based map matching on the measurement image 92 acquired in Step 66 and the image 91 selected in Step 67 to identify which shape depicted in the measurement image 92 corresponds to which area in the selected image 91.

Once the corresponding area is identified in Step 68, the horizontal position calculator 38 searches the corresponding area in the selected image for the pixel that corresponds to the position at which the relative distances from the structures were detected, that is, the position of the center C92 of the measurement image 92, which center is also that of the underwater vehicle 9. Then in Step 69, the horizontal position calculator 38 calculates the horizontal position of the underwater vehicle 9 based on the position of the identified pixel and the position of the reference pixel of the selected image 91 to which horizontal position information is attached. In Step 70, the position/attitude storage unit 80 stores the calculated horizontal position of the underwater vehicle 9, thus completing the horizontal position calculation.

Step 69 is further discussed below with reference to FIG. 10. Because the selected image 91 and the measurement image 92 include a matched area as shown by the matching image 93 of FIG. 10, it is possible to identify the pixel in the selected image 91 that corresponds to the center C92 of the measurement image 92. Also, because the pixel of the center C91 of the selected image 91 is the reference pixel that indicates the center of the hollow cuboid 90, it is possible to obtain the horizontal position of the center C92, i.e., the horizontal position of the underwater vehicle 9, by calculating the pixel distance (shift amount 94) between the center C91 and the center C92 and converting the shift amount 94 into distance data regarding the hollow cuboid 90. To convert the shift amount 94 into the distance data, the shift amount 94 (ξ, η) can be multiplied by the reciprocal of the above-mentioned coefficient K (i.e., 1/K), which coefficient is used by the measurement image acquisition unit 36 for conversion from distance to pixel values.

The aforementioned attitude angles, vertical position, and horizontal position of the underwater vehicle 9 calculated Steps 41, 42, and 44, respectively, are output from the position/attitude storage unit 80 to the display device 12.

Figure 13:
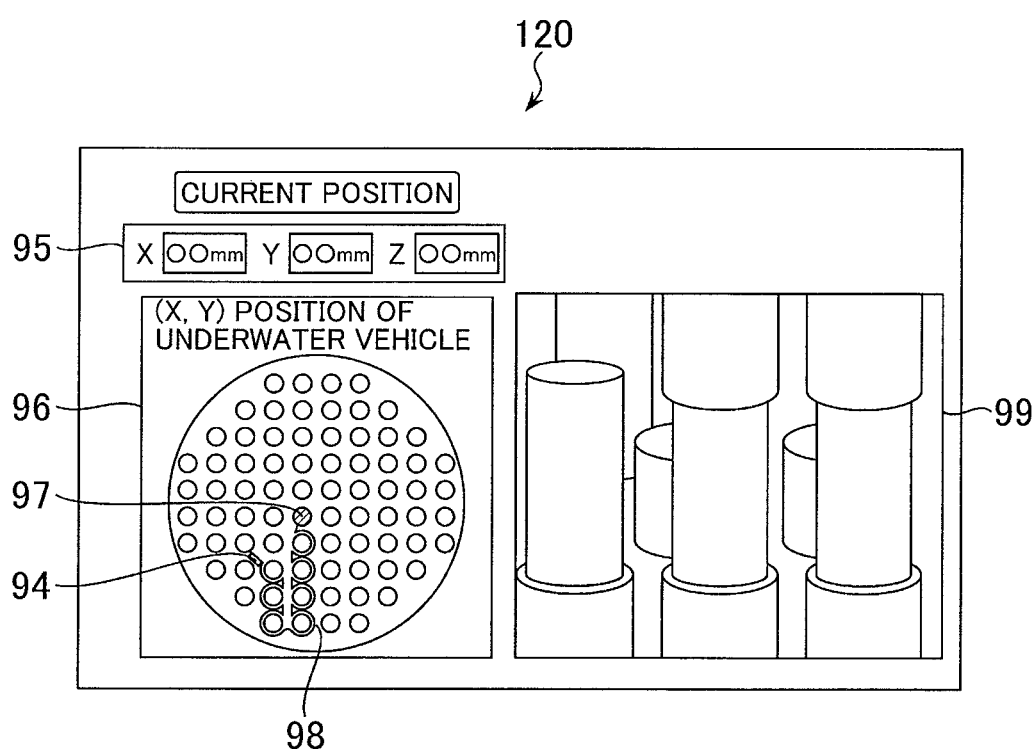
FIG. 13 is a diagram illustrating an exemplary screen displayed by a display device according to an embodiment of the invention.

FIG. 13 is a diagram illustrating an exemplary screen displayed by the display device 12.

The display screen 120 of FIG. 13 includes a positional coordinate display section 95, a horizontal position display section 96, and a camera image display section 99. The positional coordinate display section 95 displays the absolute position of the underwater vehicle 9 read from the position/attitude storage unit 80 of the control device 11. The horizontal position display section 96 displays a marker 94 that indicates the horizontal position of the underwater vehicle 9 as well as a horizontal cross-section image of the nuclear reactor 1 that is taken from the vertical position at which the underwater vehicle 9 lies. The horizontal cross-section image displayed by the horizontal position display section 96 is created by the design data of the nuclear reactor 1 (e.g., CAD data) stored on a design data storage unit (not shown) of the control device 11 and by the vertical position of the underwater vehicle 9 calculated by the vertical position calculator 33. The horizontal cross-section image changes its appearance in response to the vertical movement of the underwater vehicle 9. The horizontal position display section 96 is also provided with the functions of indicating the launch position (initial position) of the underwater vehicle 9 with a marker 97 and displaying or hiding a moving path 98 of the underwater vehicle 9. The camera image display section 99 displays an image acquired with the camera 15 of the underwater vehicle 9. It should be noted that the display device 12 is also capable of displaying another screen (not shown) and switching between the two display screens. Thus, the display device 12 can also display the attitudes of the underwater vehicle 9 read from the position/attitude storage unit 80. With the thus-configured display screen 120, the operator 14 can perform inspection while visually monitoring the position of the underwater vehicle 9 inside the nuclear reactor 1.

As stated above, the representative components of the nuclear reactor inspection system of the present embodiment are the following: the range sensor unit 23 that detects the relative distances of the underwater vehicle 9 from the internal structures of the nuclear reactor 1 in a horizontal plane where the underwater vehicle 9 lies; the measurement image acquisition unit 36 that acquires a measurement image based on the relative distances detected by the range sensor unit 23; the image selector 35 that selects an image to be used for map matching from among the images stored on the image storage unit 34 based on the vertical position of the underwater vehicle 9; the corresponding-area identification unit 37 that identifies which area in the selected image corresponds to the measurement image by performing map matching; and the horizontal position calculator 38 that calculates the horizontal position of the underwater vehicle 9 based on the position of the center of the measurement image in the selected image and the position of a reference pixel of the selected image.

The above configuration of the nuclear reactor inspection system enables the calculation of the horizontal position of the underwater vehicle 9 which is based on map matching between the selected image and the measurement image. Therefore, the error involved in the calculation can be reduced in comparison with the technology that involves calculation of the absolute position of an underwater vehicle based on integration of displacement values of the underwater vehicle (See JP-2005-315709-A). Accordingly, in accordance with the present embodiment, the accuracy of detecting the position of the underwater vehicle 9 can be enhanced. Also, in the present embodiment, multiple images that serve as reference images for the horizontal position calculation are stored in advance on the image storage unit 34, and an optimal image is selected from among the stored images based on the vertical position of the underwater vehicle 9. This simplifies the processes performed before map matching, thereby facilitating the horizontal position calculation.

Further, the underwater vehicle 9 of the present embodiment can perform inspection even in a narrow space or in an environment where complex structures exist since the underwater vehicle 9 includes as a relative distance detector the range sensor unit 23 that has the laser sensors 24a and 24b each with a light emitting unit 26 and a light receiving unit 27. For example, if either a light emitting unit or a light receiving unit is provided in an underwater vehicle and the other is provided on its surrounding structure, it is difficult to detect the position of the underwater vehicle when the underwater vehicle is placed in a narrow space or in an environment where complex structures exist. In contrast, the underwater vehicle 9 of the present embodiment includes both of the light emitting units 26 and the light receiving units 27. Thus, the position of the underwater vehicle 9 can be detected even in a narrow space or in an environment where complex structures exist.

It should also be noted that while the statement has been made that images stored on the image storage unit 34 each include at least one reference pixel to which horizontal position information is attached, that information can be attached to all the pixels of each of the stored images. In that case, the horizontal position of the underwater vehicle 9 can be calculated using only the horizontal position information attached to the pixels of an image selected from among the stored images once the pixel in the selected image at which the center of a measurement image lies is identified. This further facilitates the horizontal position calculation compared with the above case.

Moreover, while the present embodiment adopts as relative distance detectors the scanning laser sensors 24a and 24b that scan laser light in multiple directions and receive its reflected light, other types of sensors can also be used. For example, an ultrasonic sensor that emits ultrasonic waves and receives their reflected waves can be used unless the echoes of the ultrasonic waves affect other devices. The use of the ultrasonic sensor produces the same effects as those of the laser sensors 24a and 24b.

Discussed next are possible modifications of the horizontal position calculation of Step 44.

Figure 14:
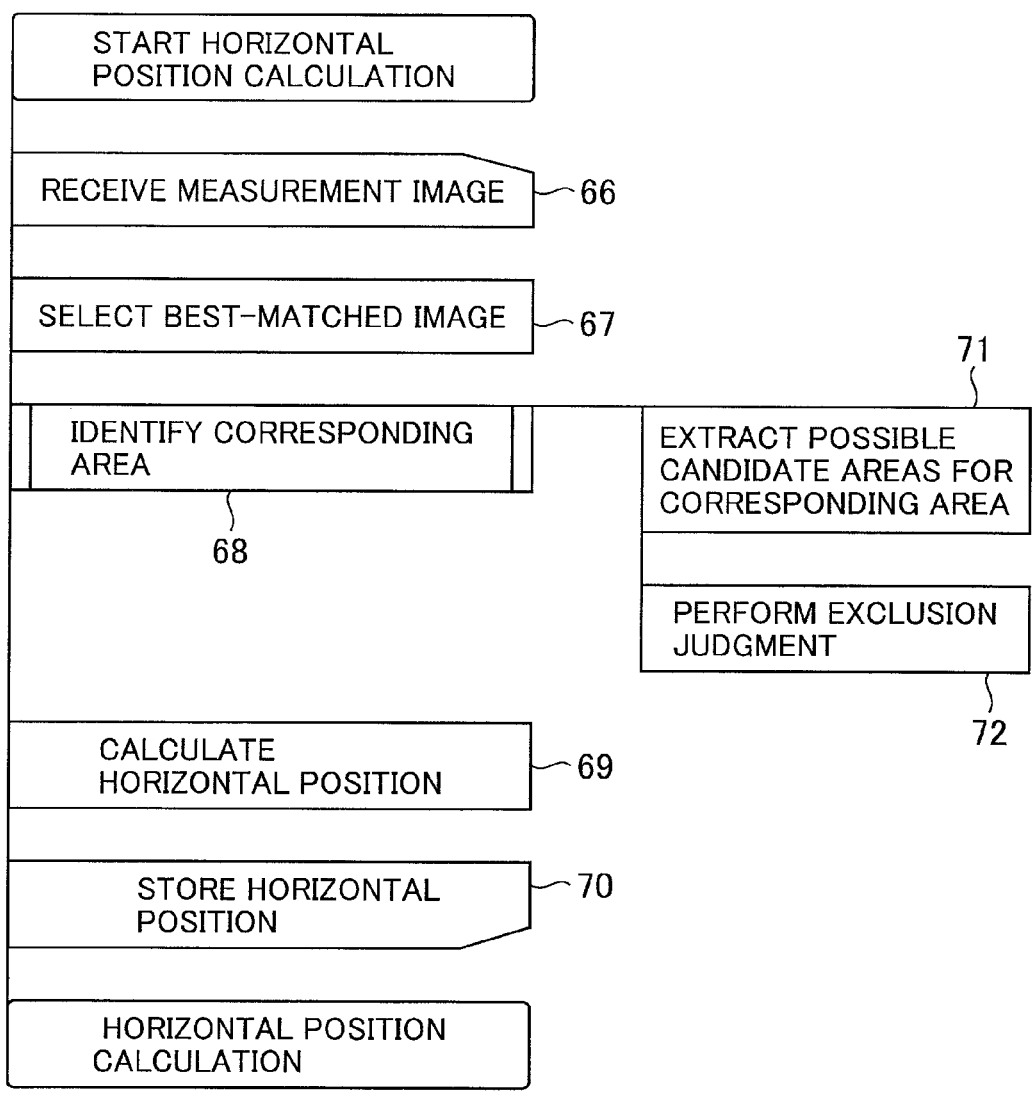
FIG. 14 is a PAD illustrating a first modification of the horizontal position calculation of FIG. 7.

FIG. 14 is a PAD illustrating a first modification of the horizontal position calculation of Step 44 shown in FIG. 7.

The first modification is effective when it is difficult to identify which area in a selected image corresponds to a measurement image, e.g., when the corresponding-area identification unit 37 detects multiple seemingly corresponding areas. In the explanation that follows, Steps 66, 67, 69, and 70 of FIG. 14 are not discussed further since they are the same as in FIG. 12.

After Step 67 in FIG. 14 is complete, the corresponding-area identification unit 37 extracts in Step 71 multiple areas that seemingly correspond to the measurement image acquired in Step 66 from the image selected in Step 67. Exemplary extraction methods include 1) extracting a given number of areas (e.g., five areas) that have high match rates and 2) extracting areas whose match rates are equal to or greater than a first threshold value M1 (M1≥M2).

Next in Step 72, the corresponding-area identification unit 37 performs exclusion judgment to select the area that includes a movable range of the underwater vehicle 9 from among the multiple areas extracted in Step 71. An exemplary calculation method to determine the movable range of the underwater vehicle 9 is utilizing the maximum speed or the travel direction of the underwater vehicle 9. Because the longest possible travel distance can be calculated from the maximum speed, the extracted areas that are located outside the area defined by the latest horizontal position and the longest travel distance of the underwater vehicle 9 can be excluded. During this time, consideration of the travel direction makes it easier to identify the area in which the underwater vehicle 9 lies. Further, if the corresponding-area identification unit 37 extracts too many or too few seemingly corresponding areas in Step 71, the value of M1 can be changed to adjust the number of areas to be extracted.

The above horizontal position calculation enables identification of the area in a selected image that corresponds to a measurement image even when it is difficult to identify the corresponding area by map matching alone. Accordingly, the horizontal position of the underwater vehicle 9 can be calculated even when a selected image includes many shapes similar to those included by a measurement image.

Figure 15:
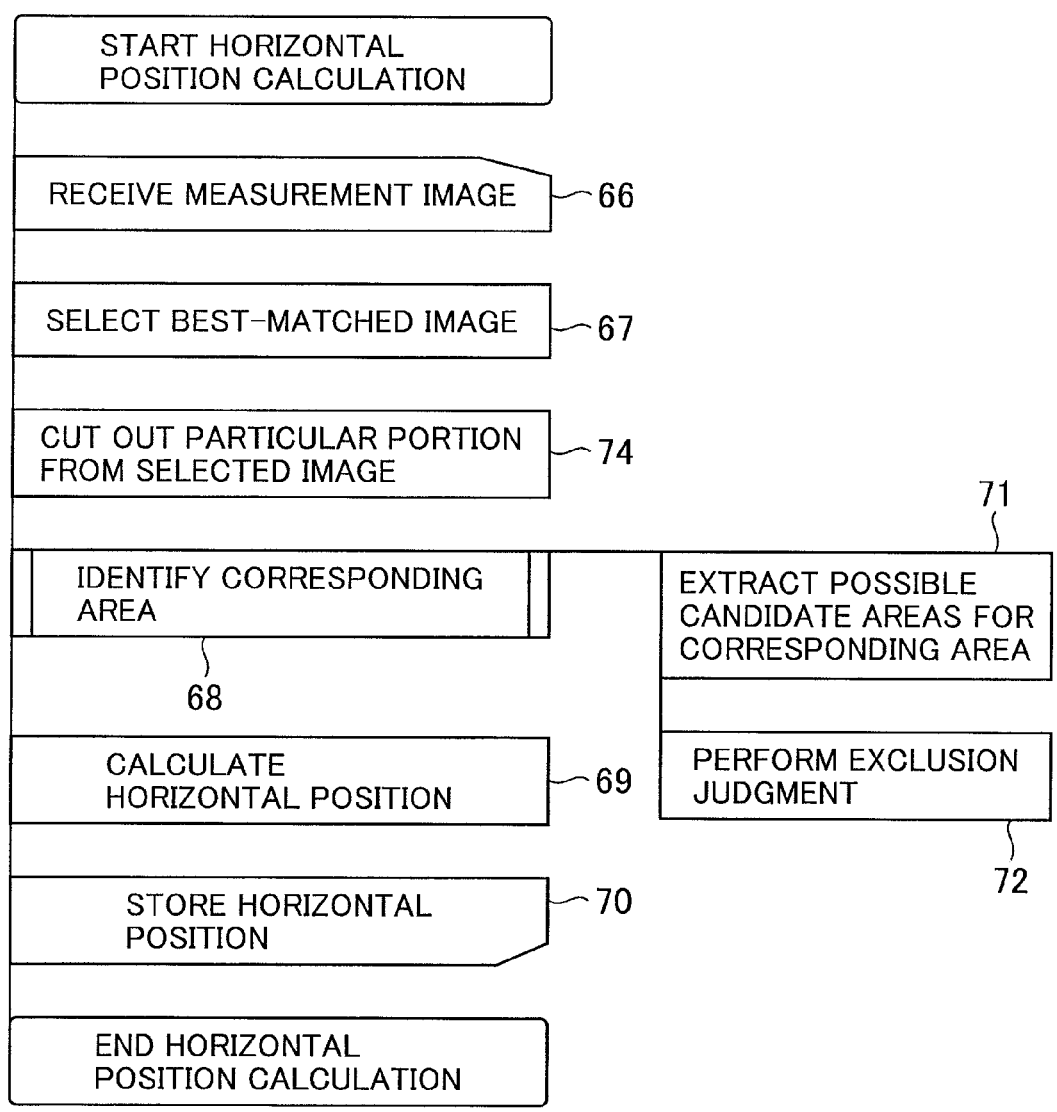
FIG. 15 is a PAD illustrating a second modification of the horizontal position calculation of FIG. 7.

FIG. 15 is a PAD illustrating a second modification of the horizontal position calculation of Step 44 shown in FIG. 7. The second modification differs from the first medication in that the second modification involves the step (Step 74) of cutting out a particular portion from the selected image obtained in Step 67 prior to the corresponding area identification (Step 68). The rest are the same as in the first modification and not discussed further.

The cut-out step in Step 74 is performed by a selected-image cut-out unit 81 of the control device 11 (see FIG. 6). The selected-image cut-out unit 81 cuts out a given portion from the image selected by the image selector 35 to obtain a cut-out image. The range of the cut-out image is a predetermined range that includes as its center the latest horizontal position of the underwater vehicle 9 detected by the horizontal position calculator 38. It is preferred that the size of the cut-out image be adjusted in advance in light of the maximum speed of the underwater vehicle 9 and the values of match rates. In the present embodiment, the cut-out image is rectangular in shape and 160×120 pixels in size and has its center the latest horizontal position of the underwater vehicle 9.

Figure 16:
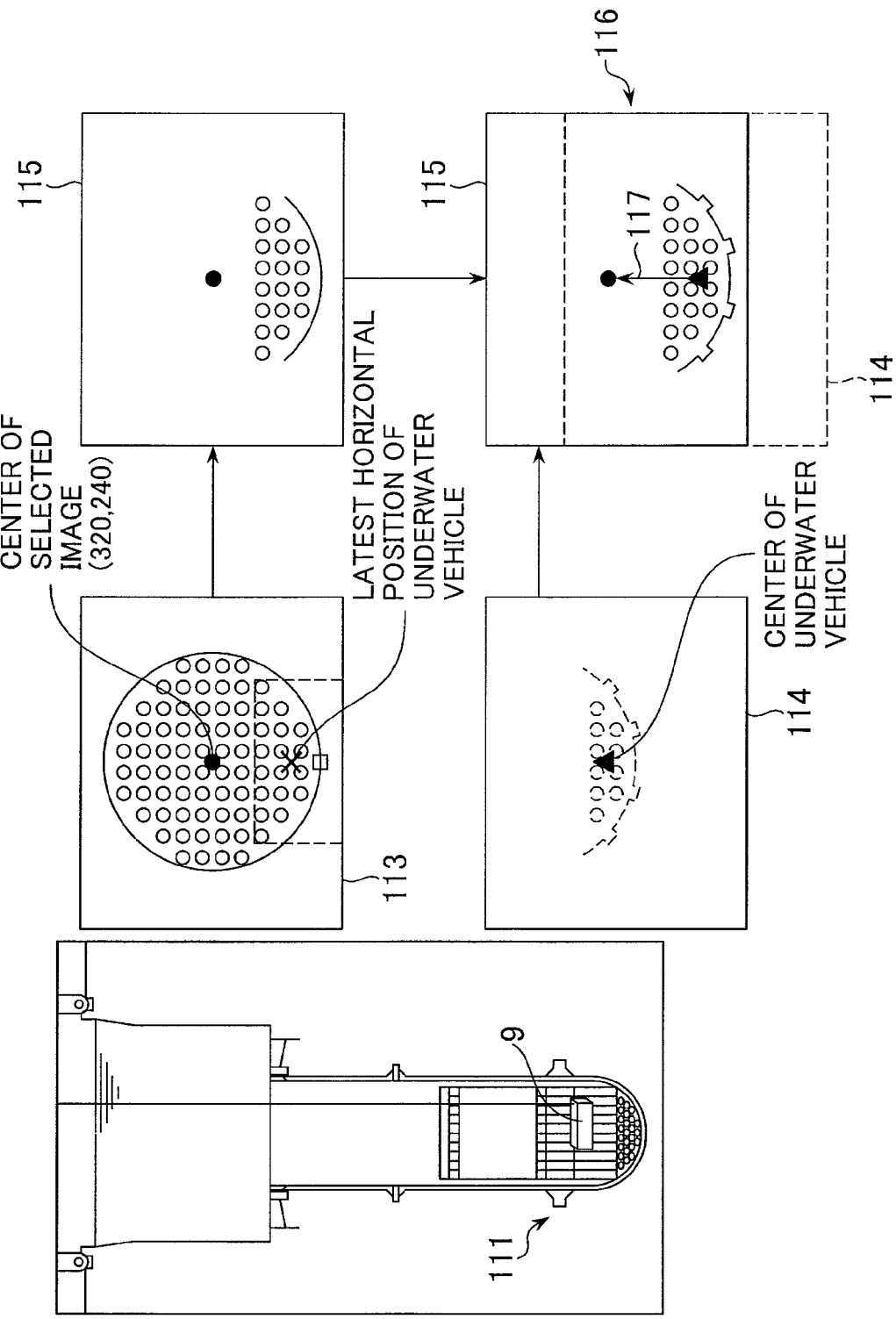
FIG. 16 is a diagram illustrating the second modification of the horizontal position calculation.

With reference now to FIG. 16, the second modification of the horizontal position calculation that involves the cut-out step is further described. FIG. 16 is a diagram illustrating the second modification of the horizontal position calculation.

FIG. 16 is based on the assumption that the underwater vehicle 9 inspects a bottom section 111 of the nuclear reactor 1. A measurement image 114 is acquired in Step 66 of FIG. 15, and an image 113 is selected in Step 67. The mark x on the selected image 114 indicates the latest horizontal position of the underwater vehicle 9. In Step 74, a cut-out image 115 is acquired that is a rectangular area (the dotted area in the selected image 113) that has the mark x as its center and is 160×120 pixels in size. Then in Step 68, the corresponding-area identification unit 37 identifies the area in the cut-out image 115 that corresponds to the measurement image 114. In this example, because the cut-out image 115 corresponds to the measurement image 114 as is obvious from the matching image 116 of FIG. 16, the pixel in the cut-out image 115 that corresponds to the center of the measurement image 114 (i.e., the center of the underwater vehicle 9) can be identified. Once that pixel can be identified, a shift amount 117 can be calculated in Step 69, thereby allowing calculation of the horizontal position of the underwater vehicle 9.

The above cut-out step can reduce the number of areas to be extracted in Step 71 in comparison with the first modification of the horizontal position calculation in which a selected image is compared with a measurement image. This makes it easier to identify the corresponding area of a measurement image. While the second modification is the process in which the cut-out step is applied to the first modification that involves the exclusion judgment, the second modification can also be applied to the process of FIG. 12 without the exclusion judgment. In that case, too, the cut-out step facilitates the corresponding-area identification (Step 68).

While the position detection system for an underwater vehicle used in a nuclear reactor inspection system has been described, the invention can also be applied to detection of the position of any object used underwater. The invention is especially suitable for detection of an underwater object placed in an environment in which the object cannot be inspected visually.

What is claimed is:

1. A position detection system for an underwater vehicle, the system comprising:
   an underwater vehicle being movable in a three-dimensional space;
   vertical position detecting means for detecting the vertical position of the underwater vehicle;
   relative distance detecting means for detecting the relative distances of the underwater vehicle from its surrounding structures in a horizontal plane determined by the vertical position of the underwater vehicle;
   measurement image acquiring means for acquiring, based on the relative distances detected by the relative distance detecting means, a measurement image that is the image data representing the outer shapes of the structures in the horizontal plane in which the relative distances have been detected;
   image storing means for storing images, each of the stored images having at least one pixel to which horizontal position information of the three-dimensional space is attached, each of the stored images being the image data of the outer shapes of the structures in a given horizontal plane of the three-dimensional space;
   image selecting means for selecting, based on the vertical position detected by the vertical position detecting means, one of the stored images that corresponds to the horizontal plane in which the relative distances have been detected from among the images stored on the image storing means;
   corresponding-area identifying means for identifying the area in the selected image that corresponds to the measurement image by performing correlation-based map matching on the selected image and the measurement image; and
   horizontal position calculating means for identifying, from the corresponding area in the selected image identified by the corresponding-area identifying means, the pixel that corresponds to the position at which the relative distances have been detected and for calculating the horizontal position of the underwater vehicle based on the position of the identified pixel and the position of the pixel in the selected image to which the horizontal position information is attached.

2. The system defined in claim 1, further comprising selected-image cut-out means for cutting out from the image selected by the image selecting means a particular area that has as its center the latest horizontal position of the underwater vehicle detected by the horizontal position calculation means to obtain a cut-out image,
wherein the corresponding-area identifying means identifies the area in the cut-out image that corresponds to the measurement image by performing the correlation-based map matching on the cut-out image and the measurement image.

3. The system defined in claim 1, wherein when the match rate of the selected image calculated by the corresponding-area identifying means is less than a second threshold value M2, the image selecting means performs reselection to select an image whose match rate is equal to or greater than the second threshold value M2 from among the stored images.

4. The system defined in claim 1, wherein the relative distance detecting means includes a laser sensor that scans laser light and receives its reflected light.

5. The system defined in claim 1, wherein the vertical position detecting means is a pressure sensor that detects the depth at which the underwater vehicle lies.

6. The system defined in claim 1, further comprising attitude angle detecting means for detecting an attitude angle of the underwater vehicle.

7. The system defined in claim 6, wherein the attitude angle detecting means includes:
an angular velocity detector for detecting angular velocities around a vertical axis of the underwater vehicle and two axes that are both perpendicular to the vertical axis and perpendicular to each other;
an azimuth detector for detecting an angle around the vertical axis; and
a tiltmeter for detecting angles around the two axes.

8. A position detection system for an underwater vehicle, the system comprising:
an underwater vehicle being movable in a three-dimensional space;
vertical position detecting means for detecting the vertical position of the underwater vehicle;
relative distance detecting means for detecting the relative distances of the underwater vehicle from its surrounding structures in a horizontal plane determined by the vertical position of the underwater vehicle;
measurement image acquiring means for acquiring, based on the relative distances detected by the relative distance detecting means, a measurement image that is the image data representing the outer shapes of the structures in the horizontal plane in which the relative distances have been detected;
image storing means for storing images, each of the stored images having at least one pixel to which horizontal position information of the three-dimensional space is attached, each of the stored images being the image data of the outer shapes of the structures in a given horizontal plane of the three-dimensional space;
image selecting means for selecting, based on the vertical position detected by the vertical position detecting means, one of the stored images that corresponds to the horizontal plane in which the relative distances have been detected from among the images stored on the image storing means;
corresponding-area identifying means for extracting a plurality of areas in the selected image that are estimated to correspond to the measurement image by performing correlation-based map matching on the selected image and the measurement image and for identifying, from among the plurality of areas extracted, an area that includes a movable range of the underwater vehicle as the area in the selected image that corresponds to the measurement image; and
horizontal position calculating means for identifying, from the corresponding area in the selected image identified by the corresponding-area identifying means, the pixel that corresponds to the position at which the relative distances have been detected and for calculating the horizontal position of the underwater vehicle based on the position of the identified pixel and the position of the pixel in the selected image to which the horizontal position information is attached.

9. The system defined in claim 8, wherein as the plurality of areas in the selected image that are estimated to correspond to the measurement image, the corresponding-area identifying means extracts areas whose match rates are equal to or greater than a first threshold value M1, the match rates being calculated by performing the map matching on the selected image and the measurement image.

10. The system defined in claim 8, wherein the movable range of the underwater vehicle used by the corresponding-area identifying means is calculated from a maximum speed of the underwater vehicle.

11. A position detection method for an underwater vehicle, the method comprising the steps of:
detecting the vertical position of the underwater vehicle being movable in a three-dimensional space;
detecting the relative distances of the underwater vehicle from its surrounding structures in a horizontal plane determined by the vertical position of the underwater vehicle;
acquiring, based on the relative distances detected in the relative distance detecting step, a measurement image that is the image data representing the outer shapes of the structures in the horizontal plane in which the relative distances have been detected;
providing an image storage unit that stores images, each of the stored images having at least one pixel to which horizontal position information of the three-dimensional space is attached, each of the stored images being the image data of the outer shapes of the structures in a given horizontal plane of the three-dimensional space;
selecting, based on the vertical position detected in the vertical position detecting step, one of the stored images that corresponds to the horizontal plane in which the relative distances have been detected from among the images stored on the image storage unit;
identifying the area in the selected image that corresponds to the measurement image by performing correlation-based map matching on the selected image and the measurement image; and
identifying, from the corresponding area in the selected image identified by the corresponding-area identifying step, the pixel that corresponds to the position at which the relative distances have been detected and calculating the horizontal position of the underwater vehicle based on the position of the identified pixel and the position of the pixel in the selected image to which the horizontal position information is attached.

* * * * *